A. SCHRECK.
GOPHER TRAP.
APPLICATION FILED NOV. 29, 1913.
1,135,626. Patented Apr. 13, 19
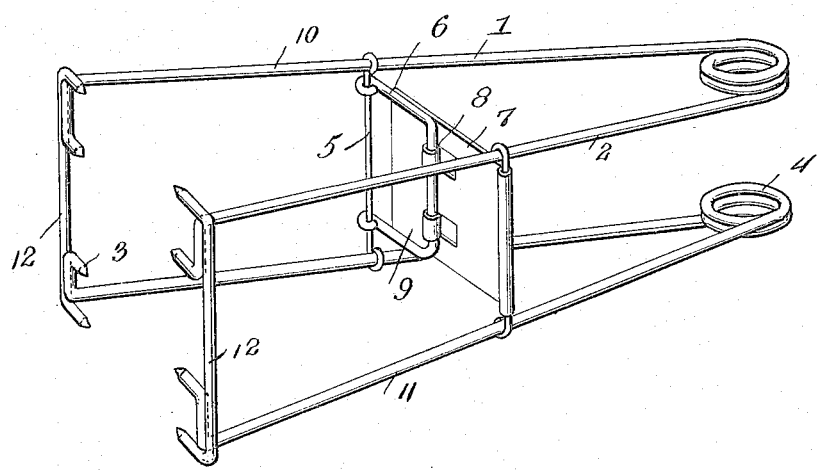
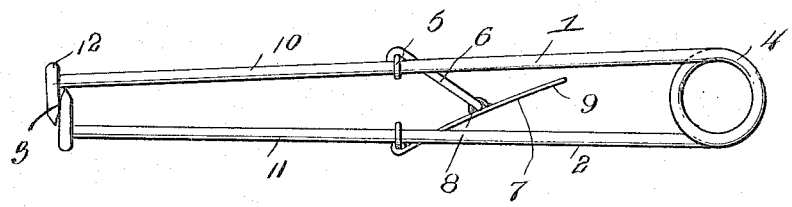
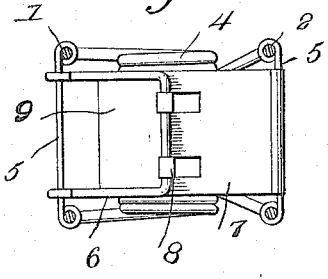
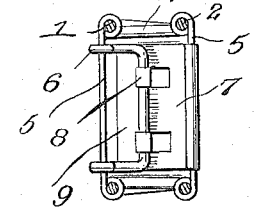
A. Schreck.

UNITED STATES PATENT OFFICE.

ADOLPH SCHRECK, OF PHOENIX, ARIZONA.

GOPHER-TRAP.

1,135,626.  Specification of Letters Patent.  Patented Apr. 13, 1915.

Application filed November 29, 1913. Serial No. 803,779.

*To all whom it may concern:*

Be it known that I, ADOLPH SCHRECK, a citizen of the United States, residing at Pheonix, in the county of Maricopa and State of Arizona, have invented new and useful Improvements in Gopher-Traps, of which the following is a specification.

This invention relates to gopher traps, and its object is to provide a trap of the spring-jaw type connected by hinged or pivoted members which, when opened, are adapted to hold the jaws spread apart, and which are adapted to close or collapse to permit the jaws to close and engage the animal.

A further object of the invention is to provide a trap which may be easily set and sprung, which is efficient and reliable in action, which may be cheaply manufactured and sold, and in which the hinged setting and releasing elements are of a self-locking type to hold the jaws spread and embodying means for limiting their opening movement and permitting of such movement in a ready and convenient manner.

The invention consists of the features of construction, combination and arrangement of parts herein fully described and claimed, reference being had to the accompanying drawing in which:—

Figure 1 is a perspective view of the trap as set for use. Fig. 2 is a top plan view showing the trap sprung. Figs. 3 and 4 are cross sectional views through the trap showing the hinged, setting and releasing elements in their opened and collapsed positions.

Referring to the drawing, 1 and 2 represent the jaws of the trap, which are provided at one end with engaging teeth 3 and have a suitable spring connection 4 at their opposite ends normally tending to close said jaws or move them with a desired force and rapidity toward each other. At points intermediate the lengths of the respective jaws are provided pintles 5 to which are hinged the relatively outer edges of a pair of setting and releasing members 6 and 7, which members are hinged or pivoted together, as at 8. These members 6 and 7 are adapted to be opened or moved forwardly in a position substantially in alinement with each other, by which the distance between their hinged outer edges is increased and the jaws spread open to set the trap for action, while at the same time the members 6 and 7 assume a lock-joint position, thereby maintaining the jaws open or spread. The members 6 and 7 are adapted, however, when light rearward pressure is placed thereon to move backward, out of lock-joint position, and to assume a folded or collapsed condition, thereby releasing the jaws for action, as will be readily understood. For the purpose of enabling the members 6 and 7 to be conveniently set and to limit the forward or opening movement of said members, one of the members, as the member 7, is provided with an extension 9 lying in the plane thereof and adapted when said members are opened to over-lap and bear against the member 6, thus limiting the opening movement of said members beyond the lock-joint position. This projection or extension 9 also serves as a finger piece by which the operator may conveniently force the members 6 and 7 to open position, by pressure of the thumb or finger inserted down between the rear portions of the jaws, the arrangement being such that the extension 9 serves as a manipulating lever.

In the particular embodiment of the invention shown, the jaws, pintles and teeth or spurs 3 of the trap are made of wire, each jaw being formed by the superposed arms of a pair of V-shaped upper and lower wire members 10 and 11, the arms of each of which wire members are connected at their rear ends by a coil spring, the two coil springs forming the spring connection 4 between the jaws. As shown the superposed arms of the frame members forming each jaw are connected by the associated pintle 5, while the forward ends of the wire arms of each jaw are connected by stays 12. Preferably the arms of each jaw are bent toward each other inwardly to provide two of the teeth 3 of a jaw, while the ends of the associated brace 12, which are braced, soldered or otherwise secured to the bent ends of the jaws, cross such bent ends of the jaws and terminate in coöperating teeth 3, each jaw thus being provided with superposed pairs of inwardly projecting teeth or spurs to engage the animal.

As is well known, the gopher is a burrowing animal which digs a chamber or excavation in the earth to which he retires, and the banks up the loose earth at the entrance of the excavation to shut out the light. In the use of the trap, when one of these excavations is discovered, the set trap is introduced into the loose earth, a sufficient amount of which is displaced to admit light into the excavation. The gopher thereupon hastens to repair the break and in so doing comes in contact with the members 6 and 7 of the trap, the pressure of the gopher on said members causing the trap to be sprung, the jaws engaging and holding the animal.

It will be obvious that the construction described is simple and inexpensive and provides a trap which may be conveniently set for action and which is reliable and efficient in operation.

I claim:—

A gopher trap comprising a pair of spring jaws, each embodying a pair of superposed arms, rods connecting said arms, a U-shaped setting and releasing member having its arms hinged at their free ends to one of said rods, and a second setting and releasing member comprising a plate hinged at one of its end edges to the other rod and intermediate of its length to the cross portion of said U-shaped setting and releasing member, the free end of said plate being adapted to abut against the arms of the U-shaped member when said members are disposed in alinement to lock the jaws in spread position.

In testimony whereof I affix my signature in presence of two witnesses.

ADOLPH SCHRECK.

Witnesses:
J. H. LANGSTON,
O. A. KANE.

Copies of this patent may be obtained for five cents each, by addressing the "Commissioner of Patents, Washington, D. C."